United States Patent
Wang et al.

(10) Patent No.: US 11,310,046 B2
(45) Date of Patent: Apr. 19, 2022

(54) SYSTEMS AND METHODS FOR SECURE IDENTIFICATION RETRIEVAL

(71) Applicant: Google LLC, Mountain View, CA (US)

(72) Inventors: Gang Wang, Mountain View, CA (US); Marcel M. Moti Yung, Mountain View, CA (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 16/757,835

(22) PCT Filed: Sep. 3, 2019

(86) PCT No.: PCT/US2019/049333
§ 371 (c)(1),
(2) Date: Apr. 21, 2020

(87) PCT Pub. No.: WO2021/045727
PCT Pub. Date: Mar. 11, 2021

(65) Prior Publication Data
US 2021/0075614 A1   Mar. 11, 2021

(51) Int. Cl.
*H04L 9/32* (2006.01)
*G06F 16/951* (2019.01)

(52) U.S. Cl.
CPC .......... *H04L 9/3213* (2013.01); *G06F 16/951* (2019.01); *H04L 9/3236* (2013.01); *H04L 9/3247* (2013.01)

(58) Field of Classification Search
CPC ... H04L 67/303; H04L 9/3247; H04L 63/308; H04L 9/3236; H04L 9/3213; H04L 67/02;
(Continued)

(56) References Cited

U.S. PATENT DOCUMENTS

2010/0070514 A1    3/2010  Woodruff
2015/0178769 A1*   6/2015  Mirisola .................. G06F 7/24
                                                    705/14.45
(Continued)

FOREIGN PATENT DOCUMENTS

EP    2 901 653 B1    8/2015

OTHER PUBLICATIONS

International Search Report and Written Opinion for PCT Appln. Ser. No. PCT/US2019/049333 dated May 14, 2020 (17 pages).

*Primary Examiner* — Mohammad A Siddiqi
(74) *Attorney, Agent, or Firm* — Fish & Richardson P.C.

(57) ABSTRACT

The present disclosure provides systems and methods for secure identification retrieval. The method includes retrieving a value of a periodic variable and calculating a plurality of query tokens from a corresponding plurality of client device identifiers and the value of the periodic variable. Each query token is associated with a corresponding client device identifier in a first database. The method further includes receiving a first query token calculated from a client device identifier of the first client device and the value of the periodic variable and identifying a second query token of the calculated plurality of query tokens in the first database matching the first query token. The method further includes, responsive to the identification, retrieving the associated client device identifier and retrieving one or more characteristics of the first client device according to the associated client device identifier. The method further includes transmitting the retrieved one or more characteristics.

20 Claims, 3 Drawing Sheets

(58) Field of Classification Search
CPC .. H04L 63/102; H04L 63/0421; G06F 16/951
See application file for complete search history.

(56) References Cited

U.S. PATENT DOCUMENTS

| | | | |
|---|---|---|---|
| 2016/0048868 A1* | 2/2016 | Mirisola | G06Q 30/0245 705/14.44 |
| 2017/0235842 A1* | 8/2017 | Hegerty | G06F 16/248 707/728 |
| 2020/0052896 A1* | 2/2020 | Acharya | H04L 9/3213 |
| 2020/0250666 A1* | 8/2020 | Carri | H04L 9/3213 |

* cited by examiner

SYSTEMS AND METHODS FOR SECURE IDENTIFICATION RETRIEVAL

CROSS-REFERENCE TO RELATED APPLICATIONS

The present application is a National Stage Application, filed under 35 U.S.C. 371, of International Patent Application No. PCT/US2019/049333 filed on Sep. 3, 2019 titled "SYSTEMS AND METHODS FOR SECURE IDENTIFICATION RETRIEVAL," the entirety of which is incorporated by reference herein.

BACKGROUND

People may shop online for goods instead of going to brick and mortar stores. While people are visiting different web pages and domains to shop, in many instances, third parties associated with the web pages and domains may be able to identify the computing devices used to visit the web pages and use various techniques (e.g., third party cookies) to identify information about the computing devices. The third parties are often content providers that provide content to people when the people visit web pages and domains with their computing devices. Via content servers, the third parties may store the information along with device identifiers identifying the computing devices associated with the stored information in a database of the content servers.

As people continue to shop online, more and more third parties may obtain information about their computing devices, often without the people knowing. Third parties can use the information stored on the content servers to provide content to the computing devices as the computing devices visit further web pages. While there are laws that require the third parties to identify whether they have information about computing devices upon request, computing devices may provide device information (e.g., device identifiers associated with the computing devices) to the third parties when making requests if the third parties did not already have information about the device. Further, the third parties may be reluctant to reliably answer the requests from the computing devices because malicious parties may eavesdrop on the requests to determine how much information the third parties have.

SUMMARY

The systems and methods discussed herein provide a method of secure identification retrieval so computing devices need not provide information to content servers or content providers that the content servers or content providers do not already have when making a request to determine whether the content servers or content providers have already collected data about the computing devices. The computing devices may calculate query tokens specific to each computing device and, in some implementations, based on a periodic variable with a value that continually changes over time. The computing devices may be synchronized with various content servers so the content servers can calculate stored query tokens for device identifiers in databases of the content servers using the same periodic variable and crypto technique as the computing devices. To avoid any synchronizing errors between the content servers and the computing devices, in some implementations, the content server may calculate multiple query tokens for each device identifier in a database of the content server. When the content servers receive requests including the query tokens, the content servers may compare the query tokens to the stored query tokens in the database to identify a match. If a content server identifies a match, the content server may transmit a response signal (e.g., an answer) indicating a match was found. The content server may also include an identification of characteristics about the computing device associated with the matching stored query token in the response signal. If a content server is not able to identify a matching stored query token to a query token of a query, the content server may send a response signal to the computing device associated with the query indicating that no match was found.

To protect the privacy of the computing devices querying the content servers and the data confidentiality of the content servers themselves (e.g., keep an amount of data and data collection capabilities of the content servers private), content servers may confirm that a computing device is associated with the queries that the content servers receive and encrypt any answers that the content servers send to the querying computing devices. The content servers may verify the identity of computing devices by using public keys associated with device identifiers of the computing devices on a digital signature generated by the computing devices to sign their queries. The content servers may encrypt answers to the computing devices using the public keys associated with the computing devices. Consequently, only the computing devices associated with their device identifiers may obtain information from content servers about whether the content servers have collected data about them. In some implementations, the response signal indicating no match may be padded to a predetermined length, may include default or null information, and/or may be hashed or encrypted such that the negative response signal appears similar to a positive response signal to any eavesdropping device or to a malicious computing device attempting to probe for information.

The systems and methods described herein may also be used by browsers to determine which domains have collected data about the browsers. The browsers can use similar crypto techniques as described above, but with values of domains and cookies to calculate cookie query tokens. The domains can calculate stored cookie query tokens for browsers for which the domains have stored data using the same techniques and values that the browsers use to calculate cookie query tokens. The domains can compare the cookie query tokens they receive from the browsers to the stored cookie query tokens to determine if the domains have stored data for the browser. The domains may store data about the browser at a server that is hosting the domain. The domains can send a response signal to the browsers indicating whether any information about the browsers is stored and categories of the information. The domain can encrypt the response signal so malicious third parties may not be able to determine how much or what type of data the domain has gathered.

Advantageously, by implementing the systems and methods discussed herein, computing devices may securely query content servers for identifications of whether the content servers have information about the computing devices without providing content providers with any device identifying information that the content servers did not already have stored. The query tokens may continually change so content servers that did not have device identifiers of the querying devices may not obtain any lasting information about the devices. Similarly, the systems may be secure against probing attempts for information, through the use of hashed or encrypted responses and padding of negative acknowledgements. Further, the communication between the devices and the content servers may be secure to protect the content servers from providing data to malicious third parties indicating how much information the content servers have collected. Consequently, the systems and methods discussed provide a secure method of communication between computing devices and content servers so the computing devices may ask for information from content server without providing any new device identifying information and the content servers may respond without providing data to malicious third parties.

In an aspect described herein, a method for secure identification retrieval is described. The method may include retrieving, by a server device, a value of a periodic variable and calculating, by the server device, a plurality of query tokens from a corresponding plurality of client device identifiers and the value of the periodic variable. Each query token may be associated with a corresponding client device identifier in a first database. The method may further comprise receiving, by the server device from a first client device, a first query token calculated from a client device identifier of the first client device and the value of the periodic variable; identifying, by the server device, a second query token of the calculated plurality of query tokens in the first database matching the first query token; and, responsive to the identification, retrieving, by the server device, the associated client device identifier. The method may further comprise retrieving, by the server device from a second database, one or more characteristics of the first client device according to the associated client device identifier and transmitting, by the server device to the client device, the retrieved one or more characteristics.

In some implementations, the method may further comprise generating, by the server device, a probabilistic data structure based on the calculated plurality of query tokens; and comparing, by the server device, the first query token to the probabilistic data structure. Identifying the second query token may be performed responsive to the first query token matching the probabilistic data structure.

In some implementations, the probabilistic data structure may comprise a Bloom filter. In some implementations, the periodic variable may comprise a present date a stock exchange closing price, or a mutually verifiable value. In some implementations, calculating the plurality of query tokens may comprise calculating a second plurality of query tokens from the corresponding plurality of client device identifiers and a previous value of the periodic variable, the second plurality of query tokens stored in the first database in association with the corresponding client device identifier.

In some implementations, the method may further comprise removing, by the server device, a third plurality of query tokens from the first database, the third plurality of query tokens calculated from the plurality of client device identifiers and a twice-previous value of the periodic variable. In some implementations, calculating the plurality of query tokens further comprises calculating, for each of the plurality of query tokens, a one-way hash (e.g., any of the hashing functions published by the National Institute of Standards and Technology such as Secure Hash Algorithm-256) of a combination of the value of the periodic variable and the corresponding client device identifier. In some implementations, retrieving the one or more characteristics of the first client device further comprises retrieving a public encryption key of the first client device from the second database. Transmitting the retrieved one or more characteristics may further comprise encrypting the one or more characteristics with the retrieved public encryption key of the first client device.

In some implementations, the method may further comprise receiving, by the server device from a second client device, a third query token calculated from a client device identifier of the second client device and the value of the periodic variable; and determining, by the server device, that an entry does not exist in the first database corresponding to the third query token.

In some implementations, the method may further comprise, responsive to the determination that an entry does not exist in the first database corresponding to the third query token, transmitting, by the server device to the second client device, one of a random data string or a null data string. In some implementations, the plurality of client device identifiers may comprise cookie values. In some implementations, the plurality of query tokens may be calculated from the periodic value, the cookie values, and a plurality of domain identifiers, each cookie value corresponding to a domain identifier of the plurality of domain identifiers. In some implementations, a first cookie value may be associated with a first domain and shared with a second domain. In some implementations, the server device may be associated with one of the first domain or the second domain, and a second server device is associated with the other of the first domain or the second domain.

In some implementations, retrieving the associated client device identifier may further comprise retrieving a first cookie value and a first domain identifier. Transmitting the retrieved one or more characteristics may further comprise encrypting, by the server device that is associated with the second domain, the retrieved one or more characteristics with the first cookie value and the first domain identifier.

In another aspect described herein, a server device for secure identification retrieval is described. The server device may comprise a network interface in communication with a first client device of a plurality of client devices; a memory device storing a first database comprising a plurality of query tokens and a corresponding plurality of associated client device identifiers, and a second database comprising the plurality of client device identifiers and associated device characteristics; and a processor. The processor may be configured to retrieve a value of a periodic variable, calculate the plurality of query tokens from the corresponding plurality of client device identifiers and the value of the periodic variable, and receive, via the network interface from the first client device, a first query token calculated from a client device identifier of the first client device and the value of the periodic variable. The processor may be further configured to identify a second query token of the calculated plurality of query tokens in the first database matching the first query token and, responsive to the identification, retrieve, from the first database, the associated client device identifier. The processor may be further configured to retrieve, from the second database, one or more characteristics of the first client device according to the associated client device identifier, and transmit, via the network interface to the client device, the retrieved one or more characteristics.

In some implementations, the processor may be further configured to generate a probabilistic data structure based on the calculated plurality of query tokens; and compare the first query token to the probabilistic data structure. Identifying the second query token may be performed responsive to the first query token matching the probabilistic data structure.

In some implementations, the processor may be further configured to calculate a second plurality of query tokens from the corresponding plurality of client device identifiers and a previous value of the periodic variable, the second plurality of query tokens stored in the first database in association with the corresponding client device identifier. In some implementations, the processor may be further configured to remove a third plurality of query tokens from the first database, the third plurality of query tokens calculated from the plurality of client device identifiers and a twice-previous value of the periodic variable. In some implementations, the processor may be further configured to calculate, for each of the plurality of query tokens, a one-way hash of a combination of the value of the periodic variable and the corresponding client device identifier.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

As users browse the Internet, content servers may obtain device identifiers and various other data about the computing devices that users use to browse, often without the user knowing the content servers have collected such data. By obtaining device identifiers and the various other data, content servers may individually identify the computing devices to provide them with targeted content (e.g., content based on data about the computing devices). Because device identifiers of computing devices can be retrieved and stored by content server as the computing devices visit various web pages, people using the computing devices may not be able to stop their computing device from being identified by content servers. While the computing devices may query content servers to determine if the content servers have collected data about the computing devices, the content servers generally store the data based on device identifiers of the computing devices. Consequently, in such implementations, client devices that send queries to content servers for a device identification may not be able to send the queries without providing device identifiers of the client devices for the content servers to identify. Once content servers have identified the device identifiers, the content servers may store the device identifiers to provide targeted content to the computing devices in the future.

Figure 1:
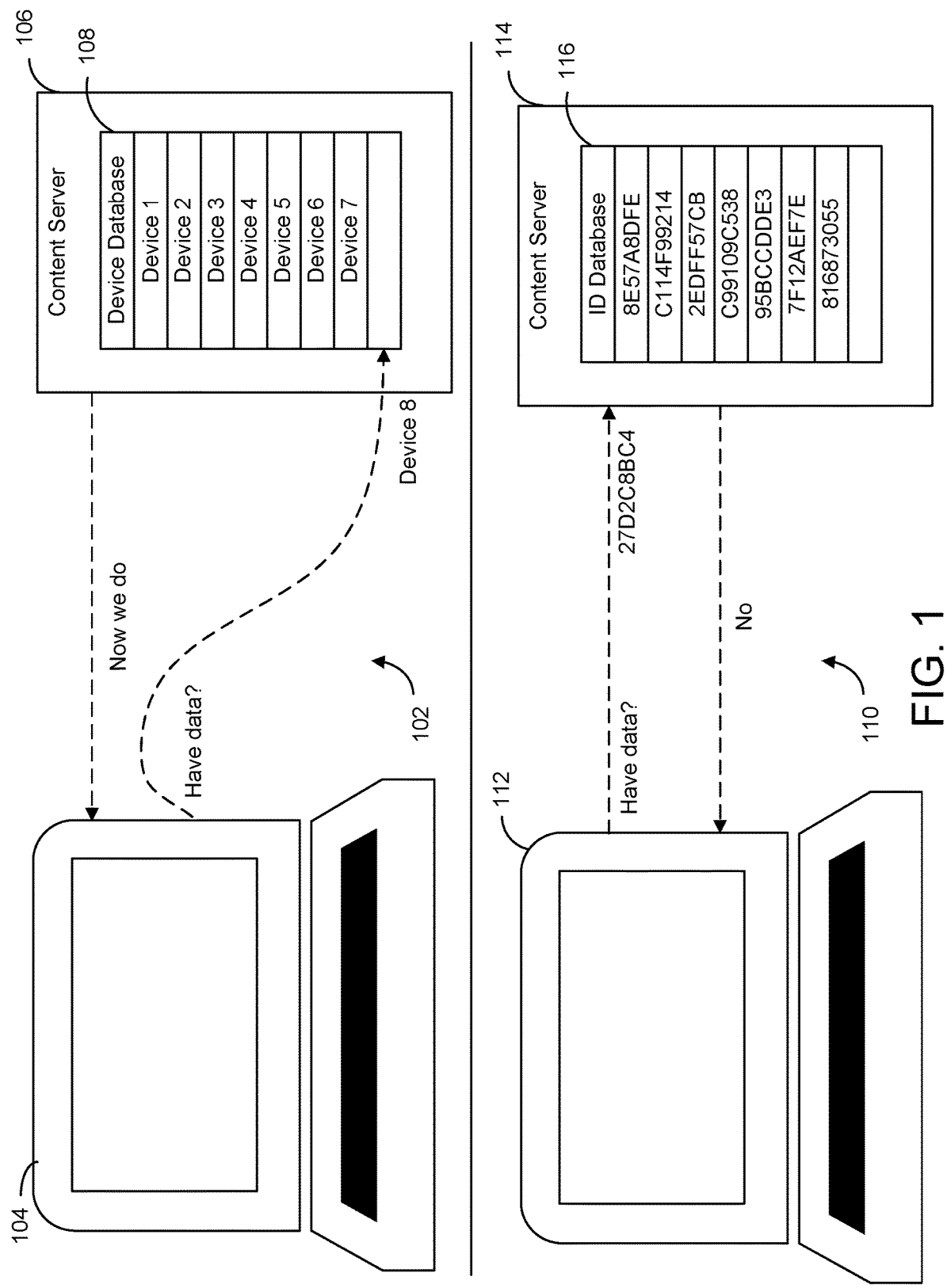
FIG. 1 is a block diagram of two sequences, each sequence including a client device querying a content server to determine if the content server has collected data about the client device, according to some implementations.

For example, referring first to FIG. 1, illustrated is a block diagram of two sequences 102 and 110, each sequence 102 and 110 including a device sending a query to a content server asking whether the content server has stored data about the device and, if the content server has stored data about the device, the type or category of the data, in some implementations. Sequence 102 may be a sequence of a client device 104 sending a query to a content server 106 for an indication of whether content server 106 has collected data about client device 104. Content server 106 may have collected data about client device 104 while client device 104 browsed the Internet and viewed various web pages and/or domains. Client device 104 may include a device identifier of client device 104 in the query so content server 106 may identify the data that content server 106 has stored and that is associated with client device 104.

At sequence 102, client device 104 may send a query to content server 106 asking if content server 106 has data about client device 104. Client device 104 may include a device identifier (e.g., Device 8) of client device 104 in the query that can individually identify client device 104. Content server 106 may include a database 108 that includes a list of device identifiers (e.g., device 1, device 2, device 3, etc.) of the various devices for which content server 106 has collected data. Content server 106 may process database 108 and compare the device identifier of the query with the device identifiers in database 108. If content server 106 identifies a matching identifier in device database 108, content server 106 may transmit a signal to client device 104 indicating that content server 106 has collected data about client device 104. If content server 106 does not identify a matching identifier in database 108, however, content server 106 may transmit a signal to client device 104 indicating that content server 106 has not collected data about client device 104.

In some implementations, if content server 106 determines that there is not a matching device identifier in database 108, content server 106 may add the device identifier of client device 104 to database 108. Content server 106 may inform client device 104 that it has added the device identifier to database 108 or, in some cases, indicate that content server 106 does not have data about client device 104 while nonetheless storing the device identifier of client device 104. Consequently, by querying content server 106 to determine if content server has data about client device 104, client device 104 may, in turn, unintentionally or undesirably provide data (e.g. client device 104 IP address) about client device 104 to content server 106. In some implementations, content server 106 may be able to obtain additional information about client device 104 along with the query, such as a device type, browser type, operating system type, or other such information (e.g. from metadata in an HTTP request such as a user agent field, identification of whether the device has a touchscreen or not (indicating that the device may be a mobile device), etc.).

Conversely, sequence 110 illustrates an example sequence of a client device 112 sending a similar query to a content server 114. In sequence 110, however, client device 112 may send an encrypted (or crypto-hashed, e.g. via SHA256) device identifier to content server 114 in the query. Specifically, in some implementations of sequence 110, client device 112 may send a query to content server 114 asking if content server 114 has data about client device 104 without including explicit or unencrypted device identifiers or other data as part of the query. To send the query, client device 112 may first calculate a query token based on a device identifier of client device 112. The query token may also be calculated based on a value of a periodic variable (e.g. a variable updated hourly, daily, weekly, or any other such interval) and a crypto technique (e.g., a one-way hashing technique like SHA256) that is known to both content server 114 and client device 112. The periodic variable may be a mutually verifiable variable that may be verified by client device 112 and content server 114. As will be described in greater detail below, in some implementations, client device 112 may calculate the query token by concatenating the device identifier of client device 112 with a value of the periodic variable and performing the crypto technique known to both client device 112 and content server 114. Client device 112 may calculate the query token (e.g., 27D2C8BC4 in the example illustrated) and send the query token to content server 114 with the query.

Content server 114 may be a server that collects data about client devices such as client device 112 and stores the data in a database 116 of content server 114. Content server 114 may collect and store device identifiers that are associated with each client device that content server 114 has stored data for. Content server 114 may calculate multiple stored query tokens for each device identifier. Content server 114 may calculate the stored query tokens using values of the same periodic variable and the same crypto technique as client device 112. In some implementations, content server 114, may store multiple stored query tokens for each device identifier in case content server 114 and client device 112 are not perfectly synchronized (e.g., are relying on data from different sources that do not match such as clocks that provide different times), which could cause a false negative if content server 114 searches database 116 for a stored query token that was calculated based on a value of the periodic variable that is different from the value that client device 112 used to calculate the query token.

Content server 114 may compare the query token that client device 112 sent to content server 114 to the stored query tokens in database 116. If content server 114 identifies a matching query token, content server 114 may transmit a signal to client device 112 indicating that a match was found. In some implementations, content server 114 may also retrieve previously stored information about client device 112 (e.g. from a separate database or associated with the token identifiers in the same database), and may transmit a signal indicating categories of data that content server 114 has collected for client device 112. If content server 114 determines that there is not a matching value, however, content server 114 may transmit a signal to client device 112 indicating that no match was found and, consequently, content server 114 has not collected data about client device 112. Client device 112 may send similar queries to any number of content servers to determine a number of content servers that have collected data about client device 112.

Advantageously, as represented in sequence 110, because client device 112 uses a crypto technique on the device identifier of client device 112, client device may transmit queries to various content servers without individually identifying itself and providing the device identifier associated with client device 112 to the content servers. While content servers that have collected data about client device 112 may be able to identify the device identifier that is associated with client device 112 based on the query token that client device 112 sends, these content servers already have the device identifier of client device 112 stored in a database. Content servers that determine that they do not have a matching query token in a database of the content servers may not be able to identify client device 112 from the query token because of the crypto techniques performed on the device identifier. For example, in sequence 110, while the content server may be able to add the identifier "27D2C8BC4" to its database, because this identifier is calculated based on the periodic variable and device identifier that is unknown to the content server, it may not be able to calculate a subsequent identifier (e.g. for the next value of the periodic identifier). Thus, any attempt to gain information about client devices not previously known to the content server may, at best, be valid only for a short time. Consequently, these content servers may only be able to transmit a signal back to client device 112 indicating that there is not a matching query in a database without identifying any information (e.g., a device identifier) of the device that sent the query.

Figure 2:
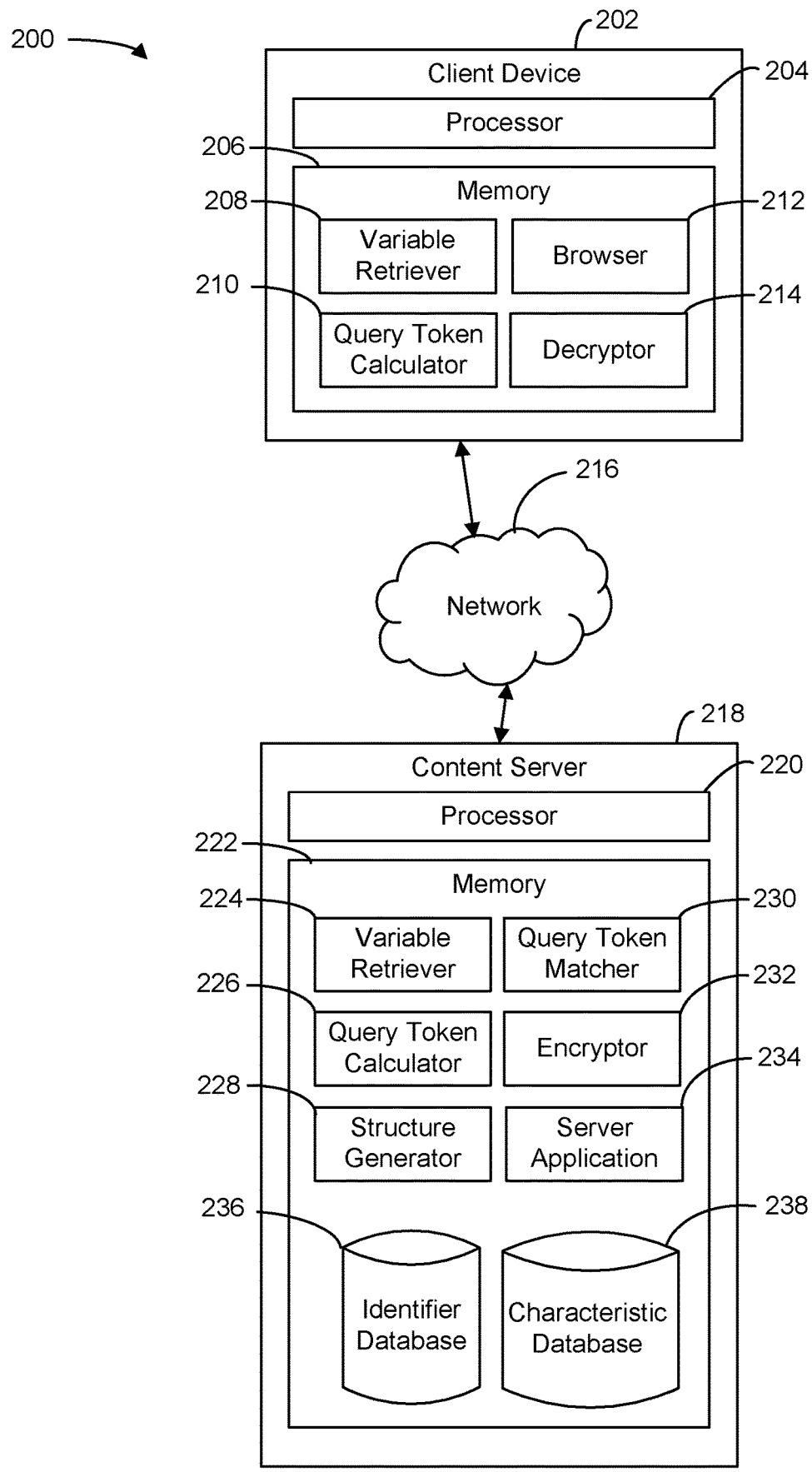
FIG. 2 is a block diagram of an implementation of a system for securely querying content servers, according to some implementations.

For example, referring now to FIG. 2, an implementation of a system 200 for secure identification retrieval is shown, according to some implementations. System 200 is shown to include a client device 202, a network 216, and a content server 218. Client device 202 can browse the Internet by visiting web pages and domains associated with different third parties. Client device 202 can browse the Internet via network 216. Network 216 can include synchronous or asynchronous networks. As client device 202 browses the Internet, content servers (e.g., content server 218) can collect and store data about client device 202. The data may include one or more characteristics (geographic location, web pages visited, content of the visited web pages, IP address, etc.) of client device 202. The content servers may identify the device identifier associated with client device 202 and store the device identifier in databases of the content servers. Client device 202 may send a request to (e.g., query) content server 218 for an identification of whether content server 218 has stored characteristics (e.g., data) about client device 202.

Client device 202 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Client device(s) may be referred to variously as a client, device, client device, user device, computing device, anonymized computing device or any other such term. Client device(s) may receive data via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

Client device 202 may comprise one or more client devices configured to securely retrieve an identification from content servers (e.g., content server 218) that indicates whether the content servers have collected data about client device 202. Client device 202 is shown to include a processor 204 and memory 206, in some implementations. One or more components within client device 202 can facilitate communication between each component within client device 202 and external components such as content server 218 and other content servers (not shown).

Processor 204 may comprise one or more processors configured to perform instructions on modules and/or components in memory 206 within client device 202, in some implementations. Memory 206 is shown to include a variable retriever 208, a query token calculator 210, a browser 212, and a decryptor 214, in some implementations. Memory 206 may include any number of components. By executing the instructions on modules in memory 206 to perform the operations of each component 208, 210, 212, and 214, processor 204 can prevent content server 218 (or any other content server) from identifying client device 202 from a request made by client device 202 to determine if content server 218 has collected data about client device 202.

In brief overview, processor 204 can calculate a query token that uniquely identifies client device 202 without providing a device identifier of client device 202 to content server 218 if content server 218 does not already have it (or providing a hashed identifier or token that may be valid for only a limited period of time, and from which other subsequent identifiers or tokens may not be calculated). Processor 204 can retrieve a value of a periodic variable that changes over time. Processor 204 can concatenate the value of the periodic variable with a device identifier of client device 202 to calculate a concatenated identifier, or may otherwise combine the periodic value and device identifier (e.g. multiply, bitwise XOR, etc., referred to generally as concatenated identifiers). Processor 204 can send the concatenated identifier to content server 218 in a query to determine if content server 218 has one or more characteristics about client device 202. Processor 204 can receive an encrypted answer from content server 218, encrypted with a public key of client device 202, and decrypt the answer using a private key specific to client device 202. In some implementations, the answer or response may not be encrypted (e.g., in some implementations in which negative responses or affirmative responses without additional data are utilized, or in which other security measures are utilized to prevent interception such as transport layer security).

Memory 206 is shown to include variable retriever 208. Variable retriever 208 may comprise an application, server, service, daemon, routine, or other executable logic to retrieve values of periodic variables, in some implementations. Variable retriever 208 may receive a request, in some cases from an administrator or user of client device 202, to query various content servers 218 to determine which content servers have collected data about client device 202. Upon receiving the request, variable retriever 208 may retrieve a value of a periodic variable.

Periodic variables may be variables with values that continually change over time and that are determined, in some cases by an administrator, such that two independent parties may independently retrieve the same values of the periodic variable when given the same information. The values may be strings including alphanumeric characters and/or symbols. For example, a periodic variable may be a current time in Chicago (e.g., 9:00PM or 21:00). If two parties in two different locations may retrieve the current time in Chicago at the same time, both parties would likely retrieve the same value. If the parties retrieved the current time in Chicago five minutes after the initial retrieval, the two parties would retrieve a different time from the time of the first retrieval, but the parties would retrieve the same time as each other. In this example, the time may be the value. Other examples of periodic variables include, but are not limited to, a present date in a specified time zone (e.g., Jun. 21, 2019), a closing value of a stock on the New York Stock Exchange (e.g., $200), a nonce value that continually increments at a set frequency, etc. Accordingly, the periodic variable may comprise any information or combination of information that updates periodically and is independently determinable or retrievable both by client devices and content servers.

As described, the values of the periodic variable may be represented in any form and may include any type of characters or symbols. For example, a present value of a stock on the New York Stock Exchange may be represented by the strings $200 or 200, the present date may be represented by the strings 6/21/2019 or 6-21-19, and the present time may be represented by the strings 9:00PM or 21:00. The values may be represented in any form. An administrator may determine a type and form of values of the periodic variable.

Variable retriever 208 may retrieve values of the periodic variable by retrieving them from various databases of client device 202 or from various servers over network 216, depending on the periodic variable. For example, if the periodic variable is the present date in Chicago, client device 202 may maintain an internal calendar based on the present date in Chicago and identify the present date from the internal calendar. In some instances, variable retriever 208 may identify the value of the periodic variable from servers across network 216. In one example, variable retriever 208 may identify and retrieve a current value of a stock on the New York Stock Exchange from servers that store such data across network 216. Variable retriever 208 may identify and retrieve values from any source.

Memory 206 is shown to include query token calculator 210. Query token calculator 210 may comprise an application, server, service, daemon, routine, or other executable logic to calculate query tokens and send them to content server 218, in some implementations. Query tokens may be one-way hashes of device identifiers concatenated with values of the periodic variable. Query token calculator 210 may identify the value of the periodic variable that was retrieved by variable retriever 208 and a device identifier associated with client device 202. Query token calculator 210 can concatenate the value of the periodic variable to the end or to the beginning of the device identifier to obtain a concatenated device identifier, or may perform other operations to combine the periodic variable and device identifier (e.g. multiplication, addition, subtraction, etc.). In some instances, query token calculator 210 can concatenate multiple instances of the value of the periodic variable to the device identifier.

Query token calculator 210 can perform a crypto technique on the concatenated device identifier to obtain a query token. The crypto technique can be a one-way crypto technique such as a one-way hash (e.g., SHA-1, SHA-256, SHA-512, MD5, etc.). Advantageously, by using a one-way crypto technique on the concatenated device identifier, query token calculator 210 may calculate a query token that cannot be deciphered by a second party or device (e.g., content server 218) to recover the device identifier in plaintext (although if the second party or device knows what the device identifier is, what the value of the periodic variable is, and which crypto technique was used to calculate the query token, the second party or device may generate a token with a matching value, and may compare the generated token and query token to identify that the underlying data (e.g. device identifier and periodic variable value) match. Consequently, client device 202 may send the query token to any content server without providing any content servers with a device identifier of client device 202 if the content servers did not already have it.

When sending the query token to content server 218, query token calculator 210 or any other component of client device 202 may digitally sign the message that the query token is contained in with a private key associated with client device 202. As described below, if content server 218 has collected data about client device 202, content server 218 may retrieve a public key associated with the device identifier of client device 202 and, based on the digital signature, verify that the message including the query token was received from the client device associated with the device identifier. If content server 218 determines that the message was not sent by client device 202 (e.g., if digital signature verification fails), content server 218 may not respond to the message and/or tear down any TCP/IP socket connection that content server 218 has with the computing device that sent the message.

Query token calculator 210 can send the calculated query token to content server 218 upon calculating the query token. In some implementations, query token calculator 210 may send the calculated query token to content server 218 after identifying content server 218 from a list of content servers that could have potentially collected data about query token calculator 210. Query token calculator 210 can download the list of content servers from a server that stores the list across network 216. Query token calculator 210 can identify each content server on the list of content servers and send the query tokens to each of or a portion of the identified content servers. Client device 202 may receive answers from each content server on the list and determine a number of content servers that have collected data about client device 202.

Content server 218 may comprise one or more servers or processors configured for secure identification retrieval when determining whether content server 218 has collected data about various computing devices (e.g., client device 202), in some implementations. Content server 218 is shown to include a processor 220 and memory 222, in some implementations. In brief overview, through processor 220, content server 218 can be configured to retrieve values for periodic variables, calculate stored query tokens that are associated with client devices for which content server 218 has collected data, receive a query token from a client device, compare the query token to stored query tokens in a database, identify a matching stored query token in the database, retrieve a device identifier associated with the matching stored query token from a second database, retrieve one or more characteristics of client device 202 based on the device identifier, and transmit the one or more characteristics to client device 202. One or more components within content server 218 can facilitate communication between each component within content server 218 and external components such as client device 202. Content server 218 can include multiple connected devices (e.g., as a server bank, a group of blade servers, or a multi-processor system), each device can provide portions of the necessary operations.

Processor 220 may comprise one or more processors configured to perform instructions on modules or components in memory 222 within content server 218, in some implementations. In some implementations, processor 220 may execute modules within memory 222. Memory 222 is shown to include a variable retriever 224, a query token calculator 226, a structure generator 228, a query token matcher 230, an encryptor 232, a server application 234, an identifier database 236, and a characteristic database 238, in some implementations.

Memory 222 is shown to include variable retriever 224. Variable retriever 224 may comprise an application, server, service, daemon, routine, or other executable logic to retrieve values of periodic values, in some implementations. Variable retriever 224 may retrieve values of periodic variables in a manner similar to how variable retriever 208 of client device 202 retrieves values of periodic variables. Variable retriever 224 may be in communication with client device 202 or receive an input from an administrator so variable retriever 224 retrieves values of periodic variables of the same type and/or from the same source as variable retriever 208 of client device 202. For example, variable retriever 208 of client device 202 may be configured to retrieve values of periodic variables corresponding to the present date in Chicago. Variable retriever 224 of content server 218 may, as a result of communication with client device 202 or from an administrator input, also be configured to retrieve values of periodic variables corresponding to the present date in Chicago. Consequently, variable retriever 208 and variable retriever 224 may retrieve the same values of the periodic variable when conducting the processes described herein (e.g., variable retriever 208 and variable retriever 224 may be synchronized).

Variable retriever 224 may retrieve multiple values of periodic variables. For example, if the periodic variable is the present date in Chicago, variable retriever 224 may retrieve values of the present date in Chicago, a date of the previous day to the present date, and/or a date of the day after the present date, thus providing a sliding window of values of the periodic variable for which query tokens may be compared. In another example, if the periodic variable is the value of a stock on the New York Stock Exchange at close, the variable retriever 224 may retrieve values associated with the stock at close for one or more days before the present date and/or the present date. Variable retriever 224 may retrieve any number of values.

In some implementations, variable retriever 224 may retrieve values of periodic variables responsive to receiving a query token from client device 202. Variable retriever 224 may receive the query token, identify the periodic variable (e.g., time of day in New York, date in New York, etc.), and retrieve the corresponding value of the periodic variable. Advantageously, by retrieving the periodic variable after receiving the query token, content server 218 may not have to continuously store values of encrypted device identifiers in a database, saving memory and storage space. However, in such implementations, the content server may need to generate sets of tokens for each device identifier in its database before processing the query token, which may require significant processing resources. In a similar implementation, the content server may iteratively generate a token for each identifier in its database using the value of the periodic variable retrieved after receiving the query token and compare each generated token to the received query token before proceeding to the next identifier, which may, on average, reduce processing time (e.g. if a match is identified after processing only a subset of the identifiers). In other implementations, as discussed below, a probabilistic data structure may be used to drastically reduce processing time for non-matching tokens.

Memory 222 is shown to include query token calculator 226. Query token calculator 226 may comprise an application, server, service, daemon, routine, or other executable logic to calculate query tokens for various device identifiers for which content server 218 has stored data. Query token calculator 226 may calculate query tokens for device identifiers in a similar manner to how client device 202 calculates query tokens. For each device identifier that is stored in a data structure of identifier database 236, described below, query token calculator 226 may concatenate the retrieved value of the periodic variable to the end or beginning of the device identifier to obtain a concatenated stored device identifier. Query token calculator 226 may perform a crypto technique on the concatenated stored device identifier that corresponds to (e.g., is the same as) the crypto technique that client device 202 performs on the concatenated device identifier of client device 202 to calculate a stored query token. Query token calculator 226 may calculate stored query tokens associated with each of or a portion of the device identifiers in identifier database 236.

In some implementations, query token calculator 226 may calculate multiple stored query tokens for each device identifier in identifier database 236. For example, as shown in the table below, query token calculator 226 may calculate stored query tokens for a device identifier that corresponds to values of yesterday's date, today's date, and tomorrow's date.

| Stored Query Token Formula | Value |
| --- | --- |
| $SHA_{256}$(DeviceID ‖ yesterday's date) | Stored Query Token |
| $SHA_{256}$(DeviceID ‖ today's date) | Stored Query Token |
| $SHA_{256}$(DeviceID ‖ tomorrow's date) | Stored Query Token |

In the table, ‖ denotes any method that concatenates strings (e.g., device identifiers and value of periodic variables) together and $SHA_{256}$ denotes an SHA-256 hashing function. Any type of value or crypto technique may be used to calculate stored query tokens. The data of the table may be stored in identifier database 236, as described below.

Memory 222 is also shown to include identifier database 236, in some implementations. Identifier database 236 can be a dynamic database including device identifiers associated with computing devices for which content server 218 has collected data. Identifier database 236 can be a graph database, MySQL, Oracle, Microsoft SQL, PostgreSql, DB2, document store, search engine, key-value store, etc. Identifier database 236 can be configured to hold any amount of data and can be made up of any number of components. The device identifiers may be associated with stored query tokens that are calculated by query token calculator 226. The device identifiers may be associated with the stored query tokens in a look-up table (e.g., a hash table) that matches the device identifiers to stored query tokens calculated by query token calculator 226. Each device identifier may be matched with multiple stored query tokens that were calculated based on different values of periodic variables. In some implementations, the device identifiers and the corresponding stored query tokens may be associated with a probabilistic data structure of identifier database 236.

In some implementations, stored query tokens of identifier database 236 may be periodically added and/or removed from identifier database 236 at fixed or variable rates by content server 218. For example, one day, query token calculator 226 may calculate query tokens for each device identifier in identifier database 236 based on values of today's date, yesterday's date, and tomorrow's date. On a second day, query token calculator 226 may remove the stored query tokens that correspond to the date two days before the date of the second day from identifier database 236. Query token calculator 226 may also add query tokens corresponding to the date of the date after the second day to identifier database 236. Consequently, the number of stored query tokens in identifier database 236 may be controlled to require a fixed amount of memory of identifier database 236 and/or reduce the amount of memory required to store the stored query tokens.

Memory 222 is shown to include structure generator 228. Structure generator 228 may comprise an application, server, service, daemon, routine, or other executable logic to generate the data structure of identifier database 236 that is associated with the stored query tokens that were calculated by query token calculator 226. The data structure may be a probabilistic data structure (e.g., a Bloom filter, HyperLogLog, Count-Min sketch, etc.). In the case of a Bloom filter, structure generator 228 may generate the probabilistic data structure so the data structure can indicate that a stored query token may be associated with the probabilistic data structure or that the stored query token is definitely not associated with the probabilistic data structure.

Structure generator 228 may generate the probabilistic data structure as an array associated with the stored query tokens. Query token calculator 226 may calculate binary arrays (e.g., arrays of a binary value) for each stored query token and add the binary arrays to the array of the probabilistic data structure. For example, structure generator 228 may calculate a binary array for a stored query token with a value of 56 to be [1, 1, 1, 0, 0, 0]. Structure generator 228 may add the binary array to the probabilistic data structure by performing an OR operation between the probabilistic data structure and the binary array of the stored query token. Structure generator 228 may add binary arrays of each stored query token in identifier database 236 to the probabilistic data structure. In some implementations, query token calculator 226 may have already calculated and/or stored the stored query tokens as binary arrays.

In some implementations, structure generator 228 may generate the probabilistic data structure by performing various hash functions on the stored query tokens and setting indices that correspond to outputs of the hash functions to one. Indices that do not correspond to the outputs may remain at zero.

When a query is made to determine whether a matching stored query token is in identifier database 236, query token matcher 230, described below, may calculate a binary array for the query token that query token matcher 230 received from client device 202. Query token matcher 230 may calculate the binary array by converting the string of the query token to binary (if the string is not already in binary) or performing various hash functions on the query token and setting the indices of the array that correspond to the output of the hash functions to one while the rest of the indices remain zero, depending on how structure generator 228 is configured to generate the probabilistic data structure. If query token matcher 230 calculates the binary array using hash functions, query token matcher 230 may use the same hash functions that structure generator 228 used to generate the probabilistic data structure to generate the binary array of the query token. Query token matcher 230 may compare the index values of the binary array with the array of the probabilistic data structure. Query token matcher 230 can compare the "1" values of the indices of the binary array of the query token with the corresponding indices of the probabilistic data structure (e.g., perform a bitwise AND operation between the query token and the probabilistic data structure). If each index value of the comparison is a one, a matching query token may be in identifier database 236 (allowing for false positives). If one index value of the comparison is a zero, however, a matching query token is not in identifier database 236. Such probabilistic data structures or filters may not result in false negatives, allowing a quick verification of whether a match exists before engaging in a more intensive token-by-token comparison.

In some implementations, structure generator 228 may update the probabilistic data structure by generating a new data structure at each instance that data is removed from identifier database 236. Structure generator 228 may perform the techniques described above to generate the new data structure. For example, if query token calculator 226 calculates stored query tokens for values of periodic variables corresponding to today's date, yesterday's date, and tomorrow's date each day, identifier database 236 may, upon determining it is a new day based on an internal calendar and clock, be configured to remove stored query tokens that correspond to the date of the day before yesterday's date and add new stored query tokens based on tomorrow's date to identifier database 236. Structure generator 228 may generate a new data structure each day that corresponds to the updated data in identifier database 236.

In some implementations, instead of generating a new data structure each day, structure generator 228 may generate a counting filter. Counting filters may be similar to bloom filters but instead of each index having a value of one or a zero, the counting filters may increment a counter for each index value that corresponds to the number of stored query tokens with a one value at the index. For example, if three stored query tokens have a one value at the same index, the index of the probabilistic data structure may have a value of three. As data structure generator 228 removes and/or adds stored query tokens to the counting filter, the value of the index may be reduced or increment, respectively. When query token matcher 230 compares the query token to the counting filter, query token matcher 230 can determine if each index value is non-zero or zero instead of one or zero to determine if the query token has a matching query token in identifier database 236.

Memory 222 is shown to include query token matcher 230. Query token matcher 230 may comprise an application, server, service, daemon, routine, or other executable logic to determine whether there is a matching stored query token in identifier database 236. Query token matcher 230 may compare query tokens that content server 218 receives from client device 202 to the data structure of identifier database 236 and/or stored query tokens of identifier database 236. If query token matcher 230 determines that there is a matching stored query token in identifier database 236, query token matcher 230 may identify the matching stored query token. Query token matcher 230 may identify the matching stored query token from a look-up table of identifier database 236 that stores stored query tokens and corresponding device identifiers.

Query token matcher 230 may determine that there is a matching query token by comparing the query token that content server 218 receives from client device 202 to the probabilistic data structure. Query token matcher 230 can identify the query token that content server 218 received from client device 202 and compare it to the bloom filter associated with the data structure of identifier database 236 as described above. Query token matcher 230 may determine a binary value (e.g., yes or no) indicating whether the query token has a matching stored query token in identifier database 236. Query token matcher 230 may receive a true answer if there may be a matching stored query token and a false answer if there is not a matching stored query token. If query token matcher 230 receives a false answer, encryptor 232 may transmit a signal to client device 202 indicating that there was not a match. If query token matcher 230 receives a true answer, encryptor 232 may transmit a signal to client device 202 indicating that there was a match.

In some implementations, if query token matcher 230 determines that there was a match based on the comparison with the probabilistic data structure, query token matcher 230 may compare the query token to the stored query tokens of a look-up table in identifier database 236. Advantageously, by comparing the query token to the look-up table in identifier database 236, query token matcher 230 may eliminate or reduce the possibility of false positives that could be generated based on the comparison with the probabilistic data structure. In some implementations, query token matcher 230 may initially compare the query token to the look-up table without comparing the query token to the probabilistic data structure. Query token matcher 230 may determine that there is a matching query token in identifier database 236 if query token matcher 230 identifies a stored query token with the same hash value (e.g., string) as the query token that content server 218 received from client device 202. Query token matcher 230 may determine that there is not a matching query token if query token matcher 230 does not identify a stored query token with a matching hash value.

Memory 222 is shown to include encryptor 232. Encryptor 232 may comprise an application, server, service, daemon, routine, or other executable logic to encrypt the answer that content server 218 transmits to client device 202 in response to queries from client device 202. In cases where query token matcher 230 does not identify a matching stored query token in identifier database 236, encryptor 232 may transmit, to client device 202, a random string or a null data string. In one example, the random string may include multiple instances of a time stamp. Consequently, when client device 202 receives the random string or null data string, client device 202 may attempt to decrypt it and determine that it is random. Based on the determination that the string is random, client device may determine that content server 218 may not have stored information about client device 202. Advantageously, by including multiple instances of a time stamp, entropy of the encryption may be increased, making it more difficult for third parties to decrypt the signal from content server 218 to client device 202. Content servers or other third parties that intercept the answer from content server 218 may not be able to decrypt or know the meaning of the random string or null data string.

However, if query token matcher 230 determines that there is a matching query token in identifier database 236, encryptor 232 may identify a device identifier associated with the matching query token and compare the device identifier to a look-up table in characteristic database 238. Each of or a portion of the device identifiers in identifier database 236 may be associated with a public key. The public keys may be stored in characteristic database 238 and associated with the device identifiers. Encryptor 232 may compare the device identifier to the table of characteristic database 238 and retrieve the public key that is associated with the device identifier. Encryptor 232 may encrypt answers that encryptor 232 sends back to client device 202 with the public key. The encrypted answer may include an identification indicating that content server 218 has collected data about client device 202 and/or one or more characteristics including information and categories of information that content server 218 has stored about client device 202. Encryptor 232 may transmit the encrypted answer to client device 202. Decryptor 214 of client device 202 can decrypt the encrypted answer as described below.

In some implementations, encryptor 232 may further encrypt the answer that is sent to client device 202 using nonce values and a time stamp. Encryptor 232 may use the following equation to encrypt the answer:

$$\text{Answer}_{encrypted} = \text{PublicKeyEncryption}(\text{Key}_{public}, \text{Answer}_{plaintext} \| \text{nonce} \| \text{timestamp})$$

As described above, ∥ depicts concatenating values of separate strings into one string. $\text{Answer}_{plaintext}$ may be the answer that encryptor 232 encrypts, and may include identifiers of information stored about client device 202. Encryptor 232 may retrieve a value of the nonce through the use of counter that is constantly incrementing (e.g., incrementing corresponding to time, messages sent between server 218 and client device 202, etc.). The nonce may be synchronized between content server 218 and client device 202 so client device 202 will know the nonce that encryptor 232 used to encrypt the answer. In some implementations, all or a portion of the nonce may be sent to client device 202 with the answer so client device 202 can identify the nonce and decrypt the answer, or may be received from client device 202 as part of the query. Encryptor 232 may generate the time stamp by retrieving the time from an internal clock of server 218. Each of the nonce and the timestamp may be concatenated with the answer in any order and any number of times.

Memory 222 is also shown to include characteristic database 238, in some implementations. Characteristic database 238 can be a dynamic database including device identifiers, public keys associated with the device identifiers, and one or more characteristics of the computing devices that are associated with the device identifiers. The private keys that correspond to the public keys may be confidentially stored on the devices that are associated with the device identifiers or other devices of the same user. Characteristic database 238 can be a graph database, MySQL, Oracle, Microsoft SQL, PostgreSql, DB2, document store, search engine, key-value store, etc. Characteristic database 238 can be configured to hold any amount of data and can be made up of any number of components. The device identifiers may be associated with stored query tokens that are calculated by query token calculator 226. The device identifiers may be associated with corresponding device identifiers of identifier database 236. Each of or a portion of the device identifiers of characteristic database 238 may be associated with a public key and/or one or more characteristics. The public key and/or one or more characteristics may be stored in a look-up table matching them to corresponding device identifiers. The one or more characteristics may include one or more of the geographic location, web pages visited, content of the visited web pages, etc., of the client devices associated with the device identifiers. The one or more characteristics may include any characteristic of the client devices or the user who interacts with the client devices or inferred characteristics of the client devices or the users.

Encryptor 232 may compare the identified client device identifier to characteristic database 238 to identify and retrieve both the public key associated with the identified device identifier of client device 202 and data of the one or more characteristics of client device 202. Using the public key, encryptor 232 may encrypt a signal including the one or more characteristics in an answer and transmit the encrypted signal to client device 202.

Referring still to FIG. 2, memory 206 of client device 202 is shown to include decryptor 214. Decryptor 214 may comprise an application, server, service, daemon, routine, or other executable logic to receive and decrypt the encrypted signal from content server 218. Decryptor 214 may access a private key specific to client device 202 from a database (not shown) of client device 202. Decryptor 214 may decrypt the encrypted signal using the private key to process the answer in the encrypted signal to determine if content server 218 has collected data about client device 202. Further, decryptor 214 can determine a category of data that content server 218 has collected if content server 218 sends a signal indicating that it has collected data about client device 202.

In some implementations, client device 202 may send query tokens to multiple content servers to determine a number of content servers that have collected data about client device 202 and categories of any data that each content server has collected. Decryptor 214 may increment and maintain a counter for each content server that transmits a signal to client device 202 indicating that an identifier of client device 202 is in a database of the content server. In some implementations, decryptor 214 may also increment and maintain counters associated with each category of data for the number of content servers that have data for client device 202 associated with each category. Through the category counters, client device 202 may determine counts for the number of content servers that have data associated with each category.

In another implementation, system 200 can be implemented so browsers of client devices can determine which content servers have data associated with the browsers. The content servers may have collected data associated with the browsers when the browsers visit domains associated with the content servers. In some instances, multiple content servers may be associated with a single domain. In some instances, a single content server may be associated with multiple domains. The content servers may collect data from browsers using cookies (e.g., third party cookies). The cookies may be device identifiers of computing devices as values of the cookies may be specific to the computing devices. The cookies may also be associated with various domains. In some instances, multiple content servers may have access to the same information that is provided by a cookie of a browser. In such instances, each content server may obtain the same or a portion of the same information from the cookie. For example, a cookie (and a value of the cookie) stored on a browser of a computing device may be associated with a first domain and a second domain. One content server may be associated with the first domain and another content server may be associated with the second domain. Consequently, while the two content servers may be associated with different domains, each content server may receive data for the browser of the computing device from the cookie.

System 200 provides a method of determining which content servers have collected data about browsers using the cookie. For example, client device 202 is shown to include browser 212. Browser 212 may comprise an application, server, service, daemon, routine, or other executable logic to generate cookie query tokens to send to content server 218 to determine if the content server has collected data about browser 212. Browser 212 can perform operations similar to the operations performed by variable retriever 208 and/or query token calculator 210 to query content servers to determine which content servers (e.g., content server 218) have collected data about browser 212 and any categories the data may fall under. Although referred to as a browser, browser 212 may comprise any type and form of application for communicating with content servers, including as part of a productivity application, media application, game application, web browser application, or other such application.

Browser 212 can generate a browser query token to send to various applications of content servers (e.g., content server 218) to determine which content servers have collected data about browser 212. Browser 212 can retrieve a value of a periodic variable (e.g., a time of day in Chicago, a date in Chicago, value of a stock on the New York Stock Exchange at close, etc.) from various servers across network 216 or from an internal database of client device 202. Browser 212 may also retrieve and/or identify, from files stored on client device 202, a value of a cookie (e.g., a cookie value) that is associated with a domain associated with the content server that browser 212 is querying and that may be specific to browser 212. Browser 212 may further retrieve a domain identifier (e.g., www.example.com) of the domain. Browser 212 may concatenate the retrieved values to obtain a concatenated cookie identifier and perform a crypto technique such as SHA-256 to encrypt the concatenated cookie identifier into a cookie query token. An example equation of this process is reproduced below:

$$\text{Browser query token} = SHA_{256}(\text{Cookie Value} \| \text{domain-} \| \text{today's date})$$

In the example, today's date is the value of a periodic variable that corresponds to the present date. Browser 212 may calculate and send the browser query token to the content server associated with the domain to determine if content server 218 and any other servers associated with the same domain and/or cookie have collected data about browser 212.

Content server 218 is shown to include server application 234. Server application 234 may comprise an application, server, FTP server, HTTP server, service, daemon, routine, or other executable logic to receive cookie query tokens from client devices (e.g., client device 202) and determine if server application 234 has collected data associated with browsers (e.g., browser 212) of the client devices. Server application 234 may calculate stored cookie query tokens for each of or a portion of the browsers from which server application 234 has collected data. Server application 234 may calculate the stored cookie query tokens by retrieving values of periodic variables in a manner similar to how browser 212 of client device 202 retrieves values of periodic variables. Server application 234 may retrieve the value of the periodic variable based on the same information (e.g., the same variable) and/or data source as browser 212 so the value that server application 234 retrieves may match the values that browser 212 retrieves. Server application 234 may retrieve the value at periodic intervals to calculate stored cookie query tokens. For example, both server application 234 and browser 212 may be configured to retrieve values associated with today's date (e.g., 2 Mar. 2019). Server application 234 may retrieve the value of today's date from an internal calendar of content server 218 while browser 212 may retrieve the value of today's date from an internal calendar of client device 202. Because the calendars of client device 202 and content server 218 may be synchronized, both server application 234 and client device 202 may retrieve the same value. Further, client device 202 and content server 218 may retrieve the same value in the same form.

In some implementations, server application 234 may retrieve multiple values of periodic variables to calculate multiple stored cookie query tokens. For example, if the periodic variable is associated with today's date, server application 234 may retrieve values of today's date for the present date, tomorrow's date, and yesterday's date. Server application 234 may retrieve any number of values associated with any periodic variables.

Server application 234 may calculate stored cookie query tokens for each cookie associated with a domain associated with server application 234. Server application 234 may calculate the stored cookie query tokens by concatenating the cookie value with the domain (e.g., a domain identifier) and the retrieved value of the periodic variable. Continuing with the example above, server application 234 may concatenate a cookie value of browser 212 with a value of the domain (e.g., the name of the domain associated with the cookie) and today's date. Server application 234 may perform a crypto technique that matches the crypto technique performed by browser 212 to calculate a stored cookie query token. In some cases, cookie values of a domain may be shared among multiple content servers (e.g., in a cookie consortium), each of which has its own domain. In such cases, the stored cookie query token may be associated with (e.g., tagged with) the value of the domain that dropped or created the cookie previously, (e.g., owns the cookie). If cookie value of the domain is not shared with any content servers but content server 218 for the domain, the stored cookie query token may not be associated with the value of the domain.

In some implementations, server application 234 may calculate multiple stored cookie query tokens for each cookie associated with various browsers. For example, as illustrated in the look-up table below, server application 234 may calculate stored cookie query tokens for each cookie associated with values of periodic variables for yesterday's date, today's date, and tomorrow's date.

| Stored Cookie Query Token Formula | Value |
|---|---|
| $SHA_{256}$(Cookie Value $\|$ domain $\|$ yesterday's date) | (Cookie Value, domain) |
| $SHA_{256}$(Cookie Value $\|$ domain $\|$ today's date) | (Cookie Value, domain) |
| $SHA_{256}$(Cookie Value $\|$ domain $\|$ tomorrow's date) | (Cookie Value, domain) |

The look-up table exemplifies look-up tables that server application 234 may have stored for cookies that are associated with various browsers. Server application 234 may store the calculated stored cookie query tokens in identifier database 236. Server application 234 may store any number of stored cookie query tokens for any number of cookies in the database. In some implementations, for each day that passes, server application 234 may remove the stored cookie query token associated with the value of yesterday's date and calculate a new stored cookie query token associated with a value of tomorrow's date.

In some implementations, the stored cookie query tokens may be associated with a probabilistic data structure (e.g., a Bloom filter) similar to the probabilistic data structure discussed above. Server application 234 may compare the cookie query token that server application 234 received from browser 212 to the probabilistic data structure to determine whether there is a matching stored cookie query token in identifier database 236. Server application 234 may compare the cookie query token to the probabilistic data structure and determine a binary yes or no answer as to whether there is a matching cookie query token in the database. The yes answer may correspond to a high probability that there is a matching stored cookie query token in identifier database 236 while the no answer may correspond to there not being a matching cookie query token in identifier database 236.

Server application 234 may receive the cookie query token from client device 202 via browser 212 and determine whether the cookie query token matches any stored cookie query tokens stored in the database. Server application 234 may compare the cookie query token to the stored cookie query tokens of the look-up tables in identifier database 236 to determine if there is a matching stored cookie query token in identifier database 236. If there is a matching stored cookie query token, that may indicate that server application 234 has collected data about browser 212 through the cookie associated with browser 212. In such a case, server application 234 may confirm that there is a matching cookie query token and identify the value and/or domain of the cookie associated with the matching cookie query token by comparing the cookie query token with the stored cookie query tokens of the look-up tables of identifier database 236.

If server application 234 confirms that there is a matching cookie query token, server application 234 can identify the value of the cookie that is associated with the matching cookie query token from the look-up table. Server application 234 can compare the value of the cookie to a second database (e.g., characteristic database 238) to identify one or more characteristics for which server application 234 has collected and stored data associated with browser 212. The one or more characteristics may be stored in a look-up table within characteristic database 238 and organized into different categories of data that server application 234 has collected about browser 212. For example, server application 234 may have collected data associated with browser 212 indicating the behavior of browser 212 on news' websites, on entertainment websites, on advertisers' websites, etc. Server application 234 may transmit a signal back to browser 212 including a Boolean response indicating whether server application 234 has collected data about client device 202 and/or a list of categories (e.g., one or more characteristics) of data that server application 234 has collected.

To ensure that malicious parties do not intercept and/or ascertain any information from server application 234 in the signal that server application 234 sends to browser 212, server application 234 may encrypt the signal using various techniques. Server application 234 may pad the response to a fixed length so malicious parties may not be able to determine an amount of data that server application 234 may have collected. Further, server application 234 may protect the signal using HTTPS protocols. Server application 234 may encrypt the signal with a symmetric key algorithm (e.g., AES) using the cookie value and domain from the look-up table described above as the encryption key. Server application 234 may also include a timestamp in the response before applying a symmetric key encryption technique.

Figure 3:
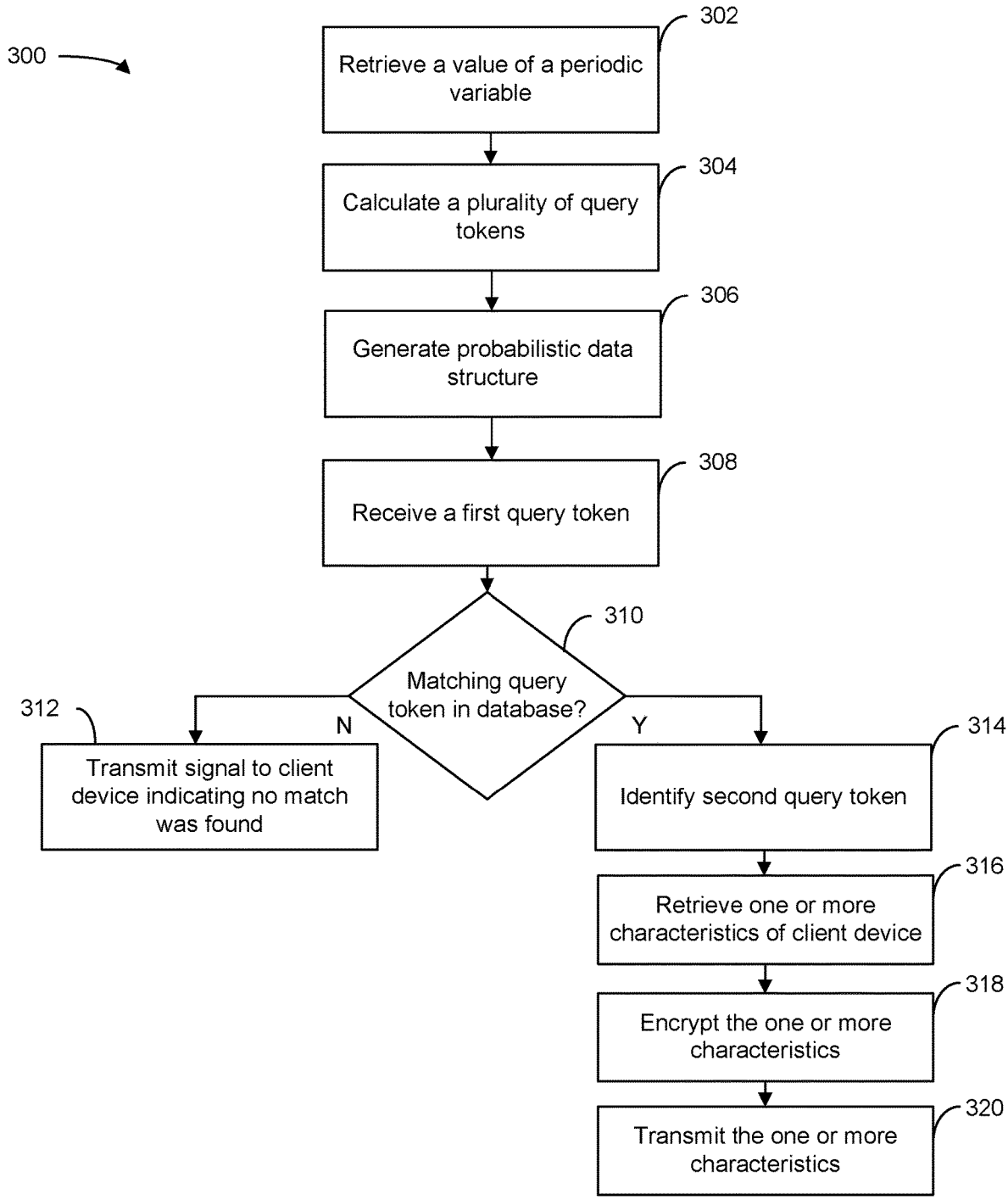
FIG. 3 is a flow chart illustrating a method for secure identification retrieval, according to some implementations.

Referring now to FIG. 3, a flow chart of a method 300 for secure identification retrieval is shown, according to some implementations. Method 300 can include any number of operations. The operations can be performed in any order. Method 300 can be performed by a server device (e.g., content server 218). At an operation 302, the server device can retrieve a value of a periodic variable. The periodic variable can be a variable with values that continually change at set or varying frequencies. For example, the periodic variable may be a present date, a present time of day, stock prices of various stocks on the New York Stock Exchange at close, nonce values determined based on an incrementing counter, etc. Depending on the periodic variable, the server device may store the values in a database within the server device or retrieve the value from another source (e.g., a database that stores values of stock prices on the New York Stock Exchange).

At an operation 304, the server device can calculate a plurality of query tokens. The server device can calculate the plurality of query tokens by identifying the value of the periodic variable and concatenating the value to the end of any client device identification numbers that the server device has information stored for to obtain a concatenated identifier for each client device. The server device can perform a crypto technique such as a one-way hash on the concatenated identifier associated with each client device to obtain the plurality of query tokens. In some implementations, the server device can calculate a second plurality of query tokens. The second plurality of query tokens can include query tokens associated with the same client devices as the plurality of query tokens but based on different periodic variable values.

At an operation 306, the server device can generate a probabilistic data structure that may be associated with each of the plurality of query tokens. The plurality of query tokens may be stored in a database of the server device. The server device may add and/or remove query tokens from the database at any time including at set intervals. The probabilistic data structure may be a Bloom filter that indicates whether a query token may be in the database to a degree of certainty or is definitely not in the database, in some implementations.

At an operation 308, the server device can receive a first query token from a client device. The client device may generate the first query token using the same or similar techniques that the server device uses to calculate each of the plurality of query tokens. The first query token may be associated with a device identifier of the client device. The client device may calculate the first query token by retrieving a value of a periodic variable and concatenate the value with the device identifier to obtain a concatenated device identifier. The client device may calculate the first query token from the concatenated device identifier by using a crypto technique on the concatenated device identifier to obtain the first query token. The crypto technique may be the same crypto technique that the server device performs to obtain each of the plurality of query tokens. The client device may send the first query token to the server device in a query to determine if the server device has information about the client device. In some implementations, before sending the query, the client device may sign the query with a private key.

At an operation 310, the server device can determine whether the server device has a matching query token to the first query token in a database of the server device. The server device can compare the first query token to the data structure of the database. If the server device does not identify a query token in the data structure that matches (e.g., has the same string of characters) the first query token, the server device may determine that there is not a matching query token of the querying client device in the database. Consequently, at an operation 312, the server device may transmit a signal to the client device indicating that no match was found.

However, if the server device identifies a query token in the data structure that matches the first query token, the server device may determine that there is a matching query token to the query token of the querying client device in the database. Consequently, at an operation 314, the server device may identify the second query token. From the second query token, the server device may identify the device identifier of the client device making a request.

At an operation 316, the server device may retrieve one or more characteristics of the client device from a second database storing characteristics of the client devices. The one or more characteristics may be data about the device that the server device has collected (e.g., geographic location, web pages visited, content of the visited web pages, etc.). The server device may compare the device identifier of the client device to a data structure of the second database to obtain a public encryption key of the client device. The server device may use the public key to verify that the query was received from the client device associated with the device identifier based on the digital signature.

At an operation 318, the server device may use the public key to encrypt the one or more characteristics in an answer to the query from the client device. The encrypted answer may include a concatenated value that the server device calculates by concatenating the answer, a nonce, and a time stamp together. The answer may include binary values (e.g., whether the server device has collected data for the client device) and/or an identification of different categories of user data (e.g., one or more characteristics) that the server device has collected about the client device. At an operation 320, the server device may transmit the one or more characteristics to the client device. The client device may decrypt the encrypted answer using the private key of the client device based on the digital signature.

Advantageously, by calculating query tokens associated with device identifiers of computing devices making requests for identifications from content servers, computing devices may remain anonymous from content servers that do not already have data about them when devices query the content servers. The systems and methods provided herein allow devices to query content servers to determine if the content servers have information about the querying devices by sending queries to the content servers without sending device identifiers of the devices. Instead, the devices may calculate query tokens using a crypto technique (e.g., a one-way crypto technique) and send the query tokens to the content servers. The query tokens may include temporary encrypted values (e.g., a time stamp or a present date), so content servers cannot identify anything about the querying devices based on the query tokens. Content servers may know the crypto technique that is used to generate the query tokens and similarly calculate corresponding stored query tokens for device identifiers that the content servers have stored. Consequently, because the query tokens may be calculated using one-way crypto techniques, content servers can only identify whether they have data about querying devices without being able to identify device identifiers of the querying devices if the device identifiers are not already known. Further, communications between the devices and the content servers may be encrypted so malicious parties may not be able to identify data about the content servers.

In situations in which the systems described herein collect personal information about users or applications installed on a user device, or make use of personal information, the users may be provided with an opportunity to control whether programs or features collect user information (e.g., information about a user's social network, social actions, or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's computing device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for secure identification retrieval, comprising:
   retrieving, by a server device, a value of a periodic variable;
   calculating, by the server device, a plurality of query tokens from a corresponding plurality of client device identifiers and the value of the periodic variable, each query token associated with a corresponding client device identifier in a first database;
   receiving, by the server device from a first client device, a first query token calculated from a client device identifier of the first client device and the value of the periodic variable;
   identifying, by the server device, a second query token of the calculated plurality of query tokens in the first database matching the first query token;
   responsive to the identification, retrieving, by the server device, the associated client device identifier;
   retrieving, by the server device from a second database, one or more characteristics of the first client device according to the associated client device identifier; and
   transmitting, by the server device to the client device, the retrieved one or more characteristics.

2. The method of claim 1, further comprising:
   generating, by the server device, a probabilistic data structure based on the calculated plurality of query tokens; and
   comparing, by the server device, the first query token to the probabilistic data structure; and wherein identifying the second query token is performed responsive to the first query token matching the probabilistic data structure.

3. The method of claim 2, wherein the probabilistic data structure comprises a Bloom filter.

4. The method of claim 1, wherein the periodic variable comprises a present date a stock exchange closing price, or a mutually verifiable value.

5. The method of claim 1, wherein calculating the plurality of query tokens further comprises calculating a second plurality of query tokens from the corresponding plurality of client device identifiers and a previous value of the periodic variable, the second plurality of query tokens stored in the first database in association with the corresponding client device identifier.

6. The method of claim 5, further comprising removing, by the server device, a third plurality of query tokens from the first database, the third plurality of query tokens calculated from the plurality of client device identifiers and a twice-previous value of the periodic variable.

7. The method of claim 1, wherein calculating the plurality of query tokens further comprises calculating, for each of the plurality of query tokens, a one-way hash of a combination of the value of the periodic variable and the corresponding client device identifier.

8. The method of claim 1, wherein retrieving the one or more characteristics of the first client device further comprises retrieving a public encryption key of the first client device from the second database; and
wherein transmitting the retrieved one or more characteristics further comprises encrypting the one or more characteristics with the retrieved public encryption key of the first client device.

9. The method of claim 1, further comprising:
receiving, by the server device from a second client device, a third query token calculated from a client device identifier of the second client device and the value of the periodic variable; and
determining, by the server device, that an entry does not exist in the first database corresponding to the third query token.

10. The method of claim 9, further comprising:
responsive to the determination that an entry does not exist in the first database corresponding to the third query token, transmitting, by the server device to the second client device, one of a random data string or a null data string.

11. The method of claim 1, wherein the plurality of client device identifiers comprise cookie values.

12. The method of claim 11, wherein the plurality of query tokens are calculated from the periodic value, the cookie values, and a plurality of domain identifiers, each cookie value corresponding to a domain identifier of the plurality of domain identifiers.

13. The method of claim 12, wherein a first cookie value is associated with each of a first domain and is shared with a second domain.

14. The method of claim 13, wherein the server device is associated with one of the first domain or the second domain, and a second server device is associated with the other of the first domain or the second domain.

15. The method of claim 12, wherein retrieving the associated client device identifier further comprises retrieving a first cookie value and a first domain identifier; and
wherein transmitting the retrieved one or more characteristics further comprises encrypting, by the server device that is associated with the second domain, the retrieved one or more characteristics with the first cookie value and the first domain identifier.

16. A server device for secure identification retrieval, comprising:
a network interface in communication with a first client device of a plurality of client devices;
a memory device storing a first database comprising a plurality of query tokens and a corresponding plurality of associated client device identifiers, and a second database comprising the plurality of client device identifiers and associated device characteristics; and
a processor, configured to:
retrieve a value of a periodic variable,
calculate the plurality of query tokens from the corresponding plurality of client device identifiers and the value of the periodic variable,
receive, via the network interface from the first client device, a first query token calculated from a client device identifier of the first client device and the value of the periodic variable,
identify a second query token of the calculated plurality of query tokens in the first database matching the first query token,
responsive to the identification, retrieve, from the first database, the associated client device identifier,
retrieve, from the second database, one or more characteristics of the first client device according to the associated client device identifier, and
transmit, via the network interface to the client device, the retrieved one or more characteristics.

17. The system of claim 16, wherein the processor is further configured to:
generate a probabilistic data structure based on the calculated plurality of query tokens; and
compare the first query token to the probabilistic data structure; and
wherein identifying the second query token is performed responsive to the first query token matching the probabilistic data structure.

18. The system of claim 16, wherein the processor is further configured to:
calculate a second plurality of query tokens from the corresponding plurality of client device identifiers and a previous value of the periodic variable, the second plurality of query tokens stored in the first database in association with the corresponding client device identifier.

19. The system of claim 18, wherein the processor is further configured to:
remove a third plurality of query tokens from the first database, the third plurality of query tokens calculated from the plurality of client device identifiers and a twice-previous value of the periodic variable.

20. The system of claim 16, wherein the processor is further configured to:
calculate, for each of the plurality of query tokens, a one-way hash of a combination of the value of the periodic variable and the corresponding client device identifier.

* * * * *